Sept. 6, 1955        W. A. GEYGER        2,717,346

MAGNETIC SERVO-AMPLIFIER

Filed April 2, 1953        2 Sheets-Sheet 1

INVENTOR
WILHELM A. GEYGER

BY

ATTORNEYS

United States Patent Office 2,717,346
Patented Sept. 6, 1955

2,717,346

MAGNETIC SERVO-AMPLIFIER

Wilhelm A. Geyger, Takoma Park, Md., assignor to the United States of America as represented by the Secretary of the Navy Application April 2, 1953, Serial No. 346,546

8 Claims. (Cl. 318—207)

(Granted under Title 35, U. S. Code (1952), sec. 266)

The invention described herein may be used by or for the Government of the United States of America for governmental purposes without the payment of any royalties thereon or therefor.

This invention relates to magnetic amplifiers, and more particularly pertains to a magnetic servo-amplifier.

Heretofore, it was known to introduce effective dynamic braking in a two-phase induction motor by means of an electronic servo amplifier of the push-pull type. In such devices, dynamic braking is effected by the direct current component of the plate current which flows through the plate circuit containing the amplifier field winding of the two-phase induction motor.

In the inventor's copending application, Serial No. 276,027, filed March 11, 1952, there is disclosed a two-core full-wave self-saturating type magnetic amplifier in which dynamic braking is achieved by push-pull operation of the magnetic amplifier. One of the field windings of the two-phase induction motor is connected to the amplifier in such a manner that the sum of the half-wave load currents which flow through the separate load windings on the reactor elements flow therethrough and produce additive effects. Control windings are arranged on the cores so that push-pull action is obtained when a control signal is applied thereto whereby the firing angles of the cores are differentially varied. Since the cores fire on alternate half cycles, the current which flows through the motor winding on one half cycle of the supply voltage differs in magnitude from the current flowing through the motor winding on the succeeding half cycle in accordance with the amplitude and polarity of the control signal. Thus, the A. C. component of the unidirectional current flowing through the motor winding increases and the D. C. component thereof decreases as the error or control signal increases, and vice versa.

The present invention utilizes a two-core full-wave external feedback magnetic amplifier to operate a two-phase induction motor and introduce a D. C. current therein to thereby effect dynamic braking of the motor. This is achieved by applying the A. C. current which flows through the controlled windings to a full-wave rectifier. The full-wave rectified current is applied to the feedback windings so that the instantaneous feedback M. M. F. is equal to an aiding M. M. F. due to the flow of current in the controlled winding on one core and is equal and opposite to the M. M. F. due to the flow of current in the controlled winding on the other core whereby the cores fire on alternate half cycles of the supply voltage. One of the motor field windings is energized by the full-wave rectified current and the control windings are arranged on the core so that push-pull operation is obtained. In this manner, the amplitude of the two half-cycle current pulses which flow through the motor winding are differentially varied in accordance with the amplitude and polarity of the control signal, whereby the A. C. component of the unidirectional current flowing through the motor winding varies in amplitude and phase in accordance with the amplitude and polarity of the control signal, and the D. C. component is a maximum when the control signal is zero and decreases as the control or error signal increases.

An important object of this invention is to provide dynamic braking for a two-phase induction motor, the amplitude of the D. C. damping current being inversely correlative with the amplitude of the control signal applied to the magnetic amplifier whereby maximum damping is obtained in proximity to the null point with decreased damping with large control signals to thereby permit faster rotor movement towards the null point.

Another object of this invention is to provide a magnetic amplifier having an unidirectional total load current, which total load current has an alternating current component and a direct current component, the alternating current component being correlative in amplitude and phase with the control signal and the direct current component being inversely related to the control signal.

A further object of this invention is to provide a magnetic amplifier which produces dynamic braking in a two-phase induction motor with a fewer number of rectifier cells than is required by a full-wave push-pull operated self-saturating circuit which produces similar results.

Other objects and many of the attendant advantages of the present invention will be readily appreciated as the same becomes better understood by reference to the following detailed description when considered in connection with the accompanying drawings wherein.

Figure 1:
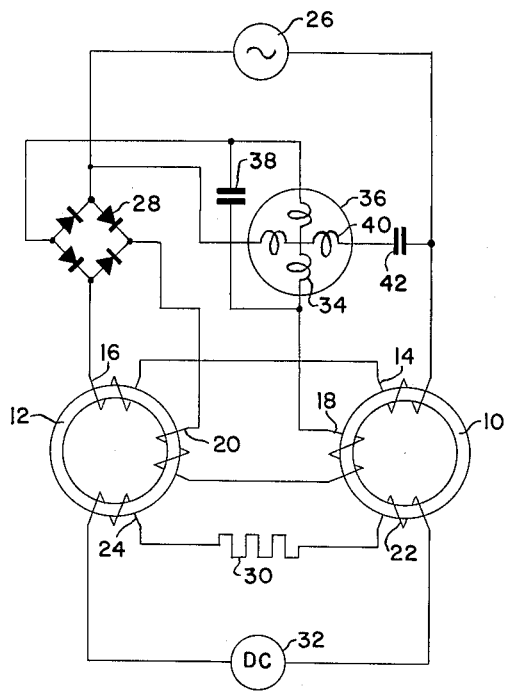
Fig. 1 is a schematic diagram of a two core full-wave external feedback type magnetic amplifier arranged for push-pull operation with D. C. control.

Reference is now made more specifically to Fig. 1 of the drawings wherein there is disclosed a two-core full-wave external feedback type magnetic amplifier arranged for push-pull operation in response to the application of a D. C. control signal. More specifically, the amplifier includes a pair of cores 10 and 12 each having load windings 14 and 16, feedback windings 18 and 20 and control windings 22 and 24 wound thereon. The controlled windings 14 and 16 are connected to a source of A. C. potential 26 so that an A. C. current flows therethrough.

In the preferred embodiment illustrated, the controlled windings 14 and 16 are connected in series. Alternatively, the controlled windings may be connected in parallel in which case, however, the speed of response of the amplifier is much lower. An unidirectional current proportional to the current flowing through the controlled windings 14 and 16 is applied to the feedback windings 18 and 20 in a direction so that instantaneous feedback M. M. F. in one core is equal to and opposite to the M. M. F. due to the flow of current in the controlled windings on that core and equal to and aiding the M. M. F. due to the flow of current in the controlled winding on the other core. For this purpose, the current flowing through the controlled windings 14 and 16 is applied through a full-wave rectifier 28 to the feedback windings 18 and 20. The number of turns in the feedback windings 18 and 20 are chosen so as to obtain the aforementioned operating conditions whereby the M. M. F. due to the flow of current through the controlled windings during one half-cycle of the power supply voltage is aided by an equal M. M. F. due to the current flow through the feedback winding on one core such as 10, and opposed by the M. M. F. due to the current flow through the controlled winding on the other core 12. During the succeeding half cycle, the current through the controlled windings reverses but the current flow through the feedback windings flows the same direction as in the preceding half-cycle whereby the magnetizing M. M. F. and feedback M. M. F. are aiding in core 12 and are opposing in core 10. Thus cores 10 and 12 are driven to saturation on alternate half-cycles of the power supply voltage 26.

The control windings 22 and 24 are arranged so as to obtain push-pull operation of the magnetic amplifier in response to the application of a control signal thereto. In the embodiment illustrated in Fig. 1, the control windings are connected in series opposition with each other, and in series with a resistor 30 across a D. C. control source 32. The control windings 22 and 24 are thus arranged so that the control M. M. F. aids the M. M. F. due to the flow of current through the controlled windings on one core and to oppose the M. M. F. due to the flow of current in the controlled windings on the other core, during the respective half-cycles of the supply voltage 26 in which the cores 10 and 12 are driven into saturation, selectively in accordance with the polarity of the control signal.

Since the impedances of the saturable core reactor elements are differentially varied in accordance with the amplitude and polarity of the control signal from the source 32, it is deemed apparent that the firing angles of the cores 10 and 12, during the respective half-cycles of the supply voltage in which the cores saturate, are differentially varied whereby the current flow through the windings 14 and 16 is increased during one half-cycle of the power supply voltage and decreased during the succeeding half-cycle. The current flowing through the controlled windings 14 and 16, is applied through a full-wave rectifier 28 so as to produce an unidirectional pulsating current having an A. C. component of fundamental frequency correlative in amplitude and phase with the magnitude and polarity of the control signal. Additionally, the unidirectional current has a D. C. component which is a maximum when the control signal is zero and which decreases as the control signal increases.

From the foregoing it is deemed apparent that a two-phase induction motor may be operated by the magnetic amplifier and be provided with phase reversible operation as well as dynamic braking. In the preferred embodiment of the invention, one of the field windings 34 of the motor 36 is connected in series with the feedback windings 18 and 20 whereby the full-wave rectified current flows therethrough. A capacitor 38 is preferably connected in shunt with the winding 34 so as to provide a by-pass for the harmonic frequencies of the fundamental supply voltage frequency of the source 26. As is conventional, the other winding 40 of the motor 36 is connected through a suitable phasing condenser 42 across the supply voltage source 26.

Figure 2:
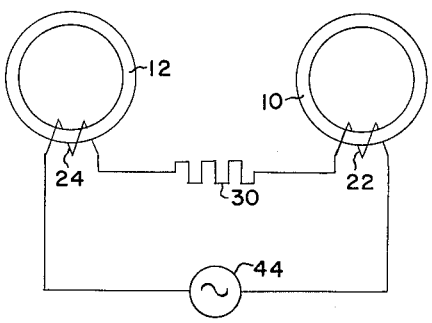
Fig. 2 is a schematic diagram of a control circuit for obtaining push-pull operation in response to an A. C. control signal applied to series connected control windings.

Push-pull operation of the two-core full-wave external feedback type magnetic amplifier illustrated in Fig. 1 may also be obtained from an A. C. control source. As illustrated in Fig. 2, the control windings 22 and 24 on cores 10 and 12 respectively are connected in series aiding with each other, and with the resistor 30 across the A. C. control source 44. Since the control source frequency is preferably equal to that of the supply source 26, the phase of the control signal is reversed during each cycle of the supply voltage whereby the control flux aids the flux due to the flow of current through the controlled windings on one core during the half-cycle the power supply voltage during which it saturates, and opposes the flux due to the flow of current to the controlled winding on the other core during the half-cycle in which the latter core is driven to saturation.

Figure 3:
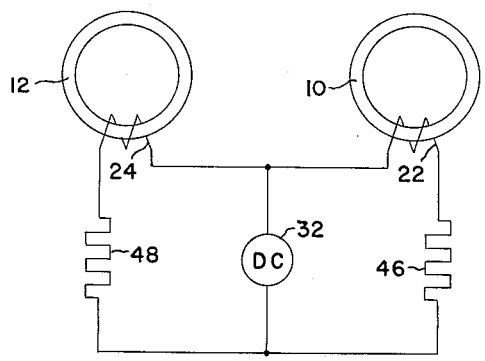
Fig. 3 is a schematic diagram of a control circuit for effecting push-pull operation in response to a D. C. control signal applied to parallel connected control windings.
Figure 4:
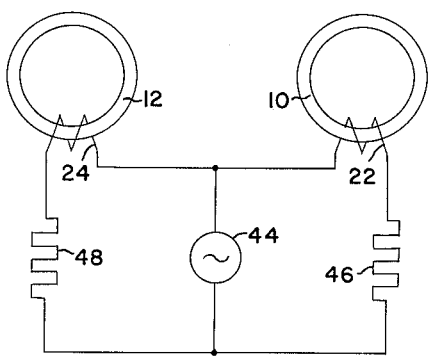
Fig. 4 is a schematic diagram of a control circuit for effecting push-pull operation of the magnetic amplifier in response to an A. C. control signal applied to parallel connected control windings.

Fig. 3 illustrates a modified control circuit for obtaining push-pull operation in response to a D. C. control signal, with the control windings 22 and 24 connected in parallel with each other. In that embodiment, control winding 22 is connected in series with resistor 46 across the D. C. control source 32 and control winding 24 is connected in series with resistor 48 across the control source 32. In the event it is desired to utilize A. C. control with parallel-connected control windings, the connections of the control winding must be reversed, as illustrated in Fig. 4, the control winding 22 being connected in series with resistor 46 across the A. C. control source 44 and control winding 24 be connected in series with resistor 48 across the A. C. control source 44.

Figure 5:
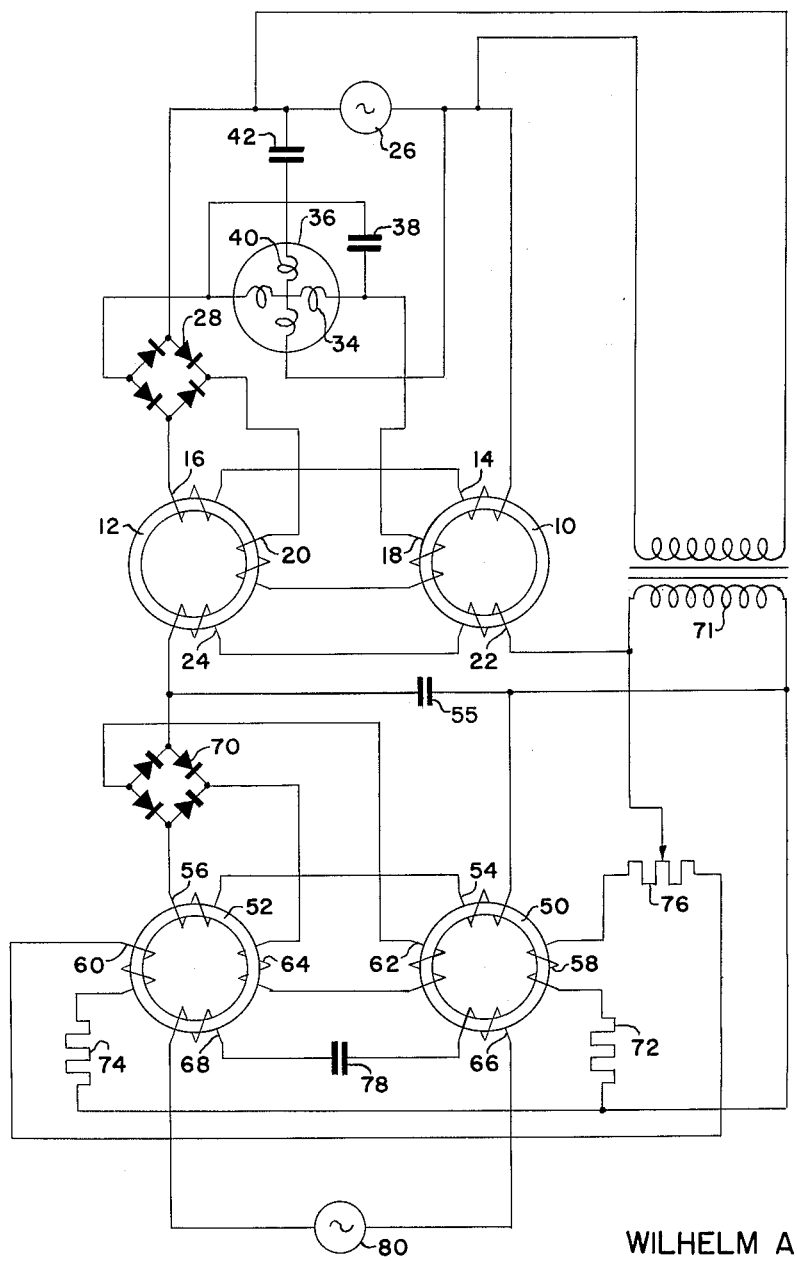
Fig. 5 is a schematic diagram of a two-stage magnetic amplifier having dynamic braking characteristics.

Fig. 5 illustrates a two-stage amplifier, the output stage being similar to that illustrated in Fig. 1 of the drawings, and in which like numerals are utilized to designate similar parts. The input stage is operated in push-pull so as to apply an A. C. signal to the control windings 22 and 24 of the output stage, which A. C. signal has asymmetrical positive and negative peaks. The A. C. component of the asymmetrical signal applied to the control windings 22 and 24 serves to bias the cores 10 and 12 to the proper operating level, the D. C. component thereof serving to differentially vary the impedance of the cores 10 and 12 during the respective half-cycles of the supply voltage 26 in which the cores saturate. The input stage includes a pair of cores 50 and 52, which cores have controlled windings 54 and 56, bias windings 58 and 60, feedback windings 62 and 64 and control windings 66 and 68 wound thereon. The controlled windings 54 and 56 are connected in series circuit with each other and with the full-wave rectifier 70 and control windings 22 and 24, which series circuit is energized by way of transformer 71 from the supply source 26. A capacitor 55 is connected in shunt with the controlled windings 54 and 56 to reduce the A. C. component of the current flowing through controlled windings 22 and 24, the value of the capacitor 55 being determined by amount of A. C. bias required to set the proper operating level in cores 10 and 12. To the output of the full-wave rectifier 70, and, as in the embodiment illustrated in Fig. 1, the feedback ampere turns are adjusted so as to cause the cores 50 and 52 to saturate on alternate half-cycles of the power supply voltage 26. Proper operating flux level in the cores 50 and 52 is established by the bias circuit which bias circuit may conveniently comprise bias winding 58 and biasing resistor 72 in one branch circuit, and bias winding 60 and biasing resistor 74 in a second branch circuit, which branch circuits are connected in parallel with each other and through balancing potentiometer 76 to the output of the transformer 71. As is conventional, resistors 72 and 74 are chosen so as to provide the proper bias level, and potentiometer 76 adjusted so that both cores fire at substantially the same point during alternate half-cycles under zero control signal conditions.

The control flux in the cores 50 and 52 is established by windings 66 and 68. In the embodiment illustrated in Fig. 5, the control windings are connected in series with each other and with a condenser 78 so as to differentially vary the impedances of the cores 50 and 52 during the respective half-cycles of the supply voltage in which the cores are driven to saturation, in response to the application of an A. C. control signal from the source 80. As is deemed apparent, push-pull operation may be obtained from a D. C. control source by merely reversing the connections to one of the control windings, or alternatively, parallel connected control windings may be utilized as disclosed in Figs. 3 and 4.

In each of the embodiments disclosed, the external feedback full-wave circuit causes the cores to saturate or fire on alternate half-cycles of the power supply voltage. The control windings are arranged so as to differentially vary the firing angle of the cores on the respective half-cycles during which the cores are driven to saturation. The A. C. current flowing through the controlled windings therefore has asymmetrical positive and negative peaks in accordance with the amplitude and polarity or phase of the control signal. When this current is passed through a full-wave rectifier, the resulting unidirectional pulsating current contains an A. C. component correlative in amplitude and phase with the amplitude and polarity of the control signal, and a D. C. component which is a maximum at zero control signal, and which decreases as the control signal increases. When utilized to control a two-phase inductive motor, the unidirectional current provides phase reversible operation as well as dynamic braking. Since the D. C. damping current decreases as the error signal increases, it is apparent that faster rotor movement is permitted when the error signal is large, the damping currents increasing as the error signal becomes less to thereby prevent overshooting of the rotor.

It has been experimentally determined that the inverse voltages applied across the rectifiers are such that only about one half of the number of dry disk rectifier cells are required in each stage of the push-pull operated external feedback circuit disclosed in the instant application as compared to the number of cells required in each stage of the self-saturating type circuit disclosed in the aforementioned application.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A magnetic amplifier control circuit for a two-phase induction motor comprising a pair of saturable reactor cores each having a controlled winding, a feedback winding and a control winding, means including a source of A.-C. potential and the controlled and feedback windings on said cores for causing said cores to saturate each on alternate half-cycles of said A.-C. potential, an energizing source for applying a control signal to said control windings, said control windings being arranged on said cores to effect push-pull operation in response to said control signal whereby the firing angles of said cores are differentially varied, means including a full-wave rectifier for applying the current flowing through the controlled windings on said cores to one field winding of said motor, and means for energizing the other field winding on said motor.

2. A magnetic amplifier control circuit for a two-phase induction motor comprising a pair of saturable reactor elements each having a controlled winding, a feedback winding and a control winding thereon, means including a source of A.-C. potential for causing a current to flow through said controlled windings, feedback means for applying an unidirectional current correlative with the current flowing through said controlled windings to the feedback windings so that the instantaneous feedback M. M. F. is equal and opposite to the M. M. F. due to the flow of current through the controlled winding on one core and equal and aiding the M. M. F. due to the flow of current through the controlled winding on the other core, an energizing source for applying a control signal to said control windings, said control windings being arranged on said cores to effect push-pull operation in response to said control signal whereby the firing angles of said cores are differentially varied, and means including a full-wave rectifier for applying the current flowing through the controlled windings to one of the field windings of said motor.

3. A magnetic amplifier control circuit for a two-phase induction motor comprising a pair of saturable reactor cores each having a controlled winding, a feedback winding and a control winding thereon, circuit means connecting said controlled windings in series with each other and with a source of A.-C. potential, feedback circuit means including said feedback windings and a full-wave rectifier for applying an unidirectional current correlative with the current flowing through the load windings to said feedback windings so that the instantaneous feedback M. M. F. is equal and opposite to the M. M. F. due to the flow of current through the controlled winding on one core and equal and aiding the M. M. F. due to the flow of current through the controlled winding on the other core, means for applying a control signal to said control windings, said control windings being commutually inversely wound on said cores to effect push-pull operation in response to said control signal whereby the firing angles of said cores are differentially varied, and means for applying an unidirectional current correlative with the current flowing through the controlled windings to one field winding of said induction motor.

4. The combination of claim 3 wherein said one field winding of said motor is connected in said feedback circuit means.

5. The combination of claim 4 including a harmonic frequency by-pass condenser in shunt with said last mentioned motor field winding.

6. A magnetic amplifier for a two-phase induction motor comprising first and second amplifier stages, each of said stages including a pair of saturable reactor cores, a controlled winding, a feedback winding and a control winding on each of said cores, means including a source of A.-C. potential and the controlled and feedback windings on the cores of said second stage for causing each of said cores to saturate on alternate half-cycles of said A.-C. potential, circuit means connecting the control windings of said second stage in series opposition with each other and in series with the controlled windings of said first stage, means including said circuit means and the feedback windings of said first stage for causing the first stage cores to saturate on alternate half-cycles of said A.-C. potential, means including the control windings on the first stage for differentially varying the firing angles of the first stage cores, and means including a full-wave rectifier for applying the current flowing through the second stage controlled windings to one field winding of said motor.

7. The combination of claim 2 wherein said control windings are connected in series opposition with each other.

8. The combination of claim 2 wherein said control windings are connected in series aiding with each other.

References Cited in the file of this patent
UNITED STATES PATENTS

| 2,519,043 | Greenwood, Jr., et al. | Aug. 15, 1950 |
| 2,529,490 | Field | Nov. 14, 1950 |

OTHER REFERENCES

"Westinghouse Engineer," September 1950, pp. 201–205.